US006894705B1

(12) United States Patent
Kalantari

(10) Patent No.: US 6,894,705 B1
(45) Date of Patent: May 17, 2005

(54) METHOD OF CREATING GRAPHICAL WORKS BASED ON POLYNOMIALS

(75) Inventor: Bahman Kalantari, Skillman, NJ (US)

(73) Assignee: Rutgers, The State University of New Jersey, New Brunswick, NJ (US)

(*) Notice: Subject to any disclaimer, the term of this patent is extended or adjusted under 35 U.S.C. 154(b) by 141 days.

(21) Appl. No.: 10/215,348

(22) Filed: Aug. 7, 2002

Related U.S. Application Data

(60) Provisional application No. 60/310,275, filed on Aug. 7, 2001.

(51) Int. Cl.[7] ................................................ G09G 5/00
(52) U.S. Cl. ..................................................... 345/643
(58) Field of Search ......................................... 345/643

(56) References Cited

PUBLICATIONS

Pergler, Martin. "Newton's Method and Newton Basin Fractals." Nov. 25, 1999. p. 1–6. Available at http://www.math.uchicago.edu/~pergler/genteach/newton/newton.html.*

Kalantari, Bahman and I. Kalantari and R. Zaare–Nahandi. "A Basic Family Of Iteration Functions For Polynomial Root Finding And Its Characterizations." 1997. Abstract and p. 1. Available at http://citeseer.ist.psu.edu/kalantari97basic.html.*

* cited by examiner

Primary Examiner—Matthew C. Bella
Assistant Examiner—Aaron M. Richer
(74) Attorney, Agent, or Firm—Kenneth Watov; Watov & Kipnes, P.C.

(57) ABSTRACT

The present invention provides a method for approximating zeros (roots) of polynomials using an iterative technique and displaying graphical images based on the results of that technique. The science of polynomiography is based on the use of at least one of an infinite number of iteration functions designed for the purpose of approximation of roots of polynomials.

9 Claims, 19 Drawing Sheets

(17 of 19 Drawing Sheet(s) Filed in Color)

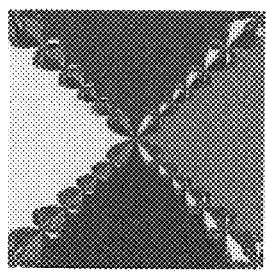 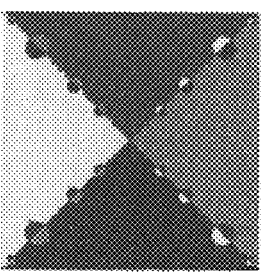 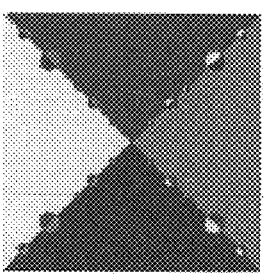 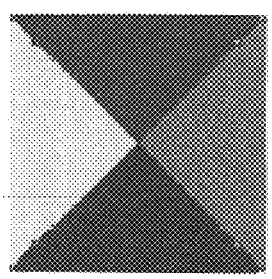
*Figure 2a*     *Figure 2b*     *Figure 2c*     *Figure 2d*

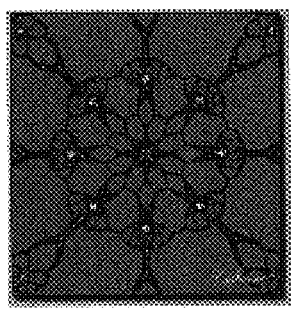 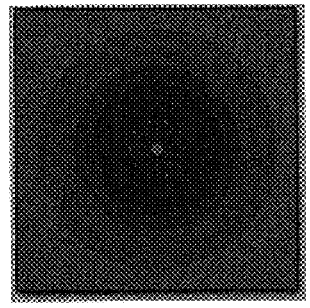
Figure 9a                    Figure 9b

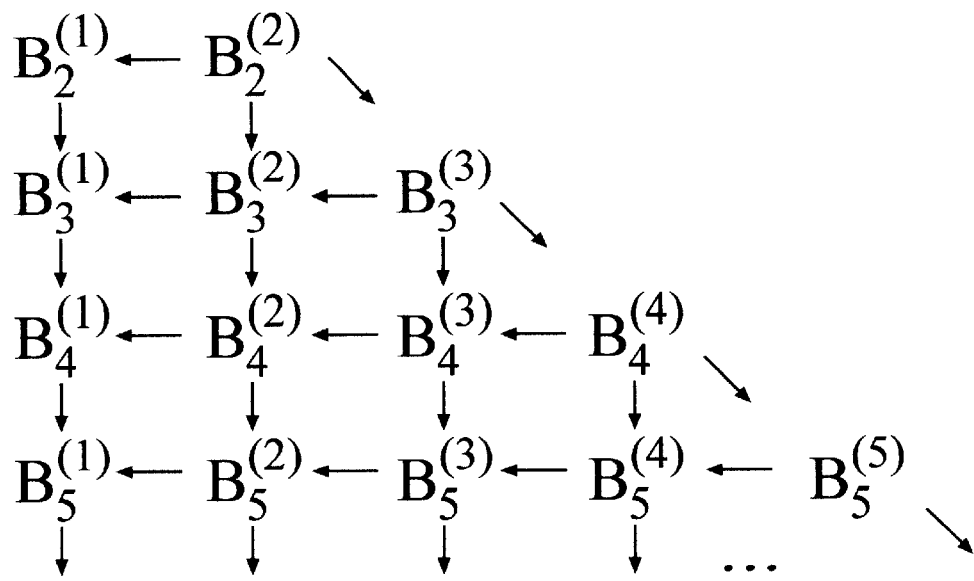
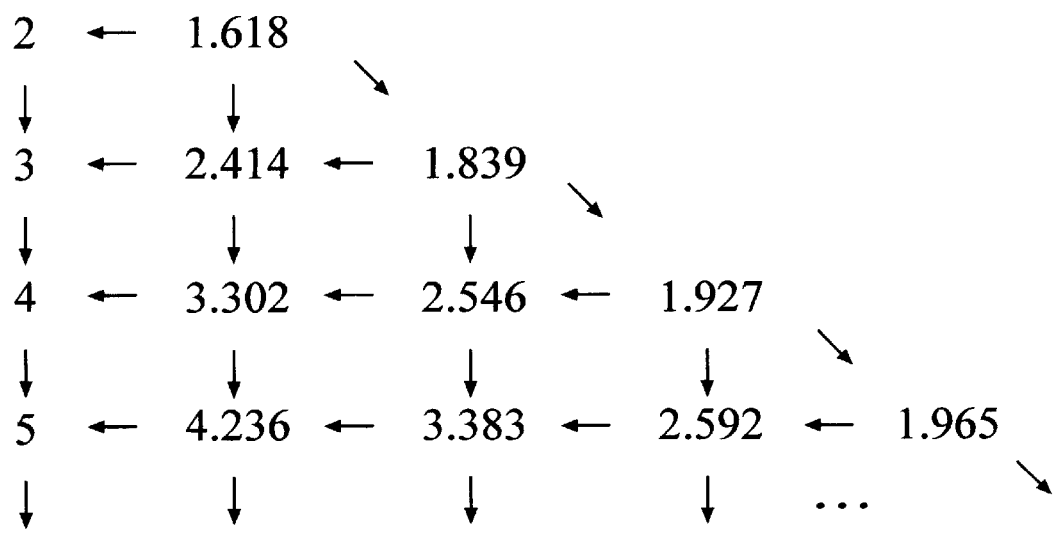
Figure 13c

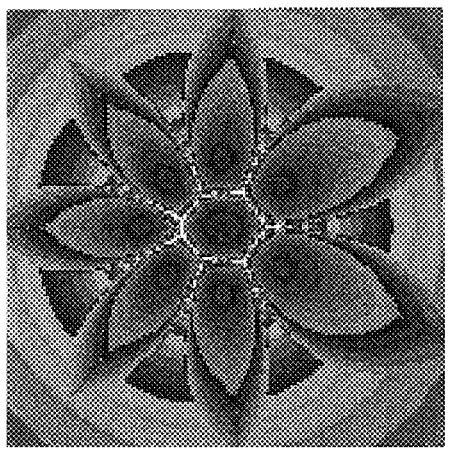
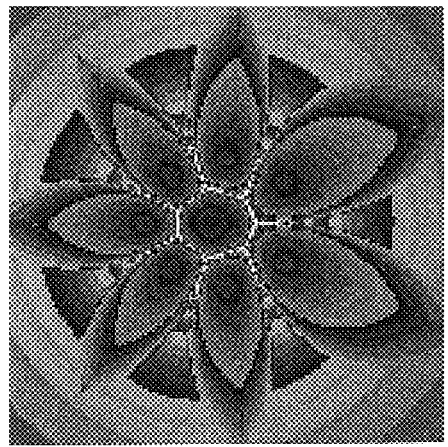
Figure 16a                    Figure 16b

METHOD OF CREATING GRAPHICAL WORKS BASED ON POLYNOMIALS

RELATED APPLICATION

This application claims priority from U.S. Provisional Patent Application, Ser. No. 60/310,275, filed Aug. 7, 2001.

FIELD OF THE INVENTION

The present invention relates to a process for creating images and, more particularly, to a process for creating images dependent on mathematical equations.

BACKGROUND OF THE INVENTION

Polynomiography is the art and science of visualization in approximation of zeros of complex polynomials, via fractal and non-fractal images created using the mathematical convergence properties of iteration functions. An individual image is called a polynomiograph, and represents a certain graph of polynomials, not in the conventional sense of plotting a graph (e.g., a parabola for a quadratic polynomial). Polynomiographs are obtained using algorithms that require the manipulation of thousands of pixels on a computer monitor. Depending upon the degree of the underlying polynomial it is possible to obtain beautiful images on a laptop computer in less than the running time of a TV commercial.

Polynomials form a fundamental class of mathematical objects with diverse applications and arise in devising algorithms for such mundane tasks as multiplying two numbers, much faster than in conventional ways. According to the Fundamental Theorem of Algebra, a polynomial of degree n, with complex coefficients, has n zeros (roots) which may or may not be distinct. The task of approximation of zeros of polynomials is a problem that was known to Sumerians in the third millennium B.C. This problem has been one of the most influential problems in the development of several important areas in mathematics.

The word "fractal," which partially appears in the definition of polynomiography, was coined by the research scientist Benoit Mandelbrot. It refers to sets or geometric objects that are self-similar and independent of scale. This means there is detail on all levels of magnification. No matter how many times one zooms in, one can still discover new details. Some fractal images can be obtained via simple iterative schemes leading to sets known as the Julia set and the Mandelbrot set. The simplicity of these iterative schemes, which may or may not have any significant purpose in mind, has resulted in the creation of numerous web sites in which amateurs and experts exhibit their fractal images.

It would be advantageous to provide a method of creating graphical artwork based on polynomial equations.

It would also be advantageous to use iterative functions to obtain roots of such polynomial equations.

It would still further be advantageous to visualize a polynomial by means of approximating the roots thereof.

SUMMARY OF THE INVENTION

The present invention provides a method for approximating zeros (roots) of polynomials using an iterative technique and displaying graphical images based on the results of that technique. The science of polynomiography is based on the use of at least one of an infinite number of iteration functions designed for the purpose of approximation of roots of polynomials.

The method includes providing a predetermined polynomial equation, approximating at least one root of the polynomial equation, generating a graphical image as a function of the root of the polynomial equation, and colorating the graphical image to produce a two-dimensional, color rendition thereof. The approximating step can include performing at least one of an infinite number of iteration functions.

Polynomiography has a well-defined and focused purpose. It makes use of at least one iteration function for polynomial root-finding. A polynomiograph may or may not result in a fractal image. The purpose of the inventive technique is to create visualization of a polynomial, via approximation of its roots and the way in which the approximation is carried out. Polynomiography represents a vast number of possibilities and degrees of freedom and results in more variety of images than typical fractal images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A complete understanding of the present invention may be obtained by reference to the accompanying drawings, when considered in conjunction with the subsequent detailed description, in which:

FIGS. 2a–2d illustrate the basins of attractions for the polynomials $P(z)=z^4-1$;

FIGS. 16a–16b depict a polynomiograph of the numbers 672123450 and 672123451.

DETAILED DESCRIPTION OF THE PREFERRED EMBODIMENT

Figure 1A:
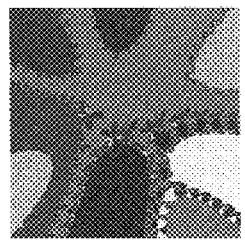
FIGS. 1a–1d are a representation of the evolution of basins of attraction to Voronoi regions via $B_m(z)$.
Figure 1B:
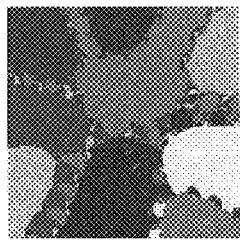
Figure 1C:
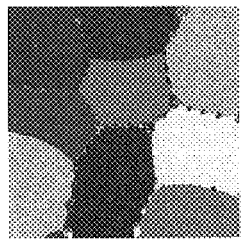
Figure 1D:
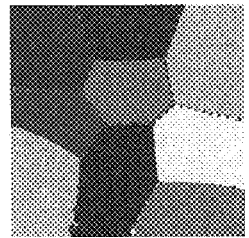
Figure 3A:
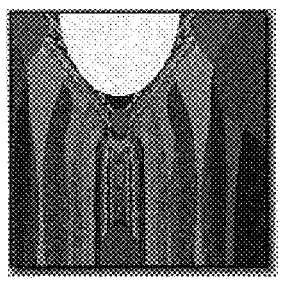
FIGS. 3a–3c; 4; 5a–5c; 6a–6c; 7a–7b; 8a–8b; 9a–9b; 10a–10e; 11a–11c; 12a–12b; 13a–13b; and 14 show images obtained through four techniques: using a variety of iteration functions and zooming approaches; using coloration, individual creativity, and imagination; employing mathematical properties of the iteration functions or the underlying polynomial, or both; or using a collage of two or more polynomiographs obtained through one or more of the previous three methods.
Figure 3B:
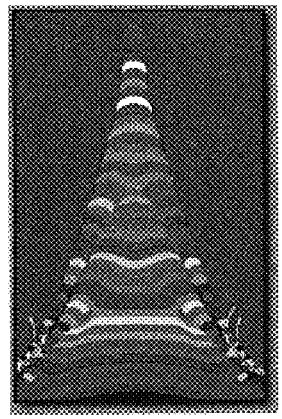
Figure 3C:
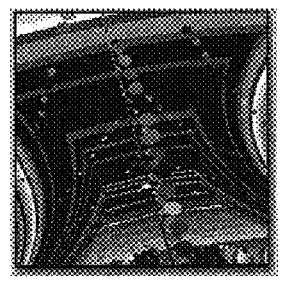
Figure 4:
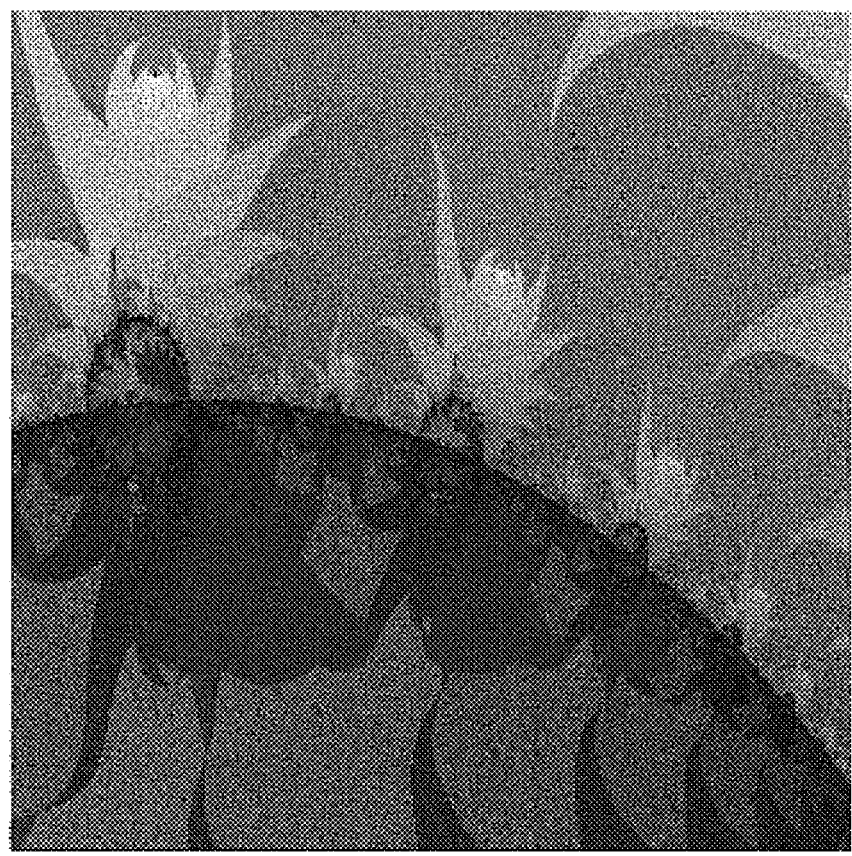

The present invention is a method of creating images based on polynomials and a technique of approximating zeros thereof. The technique uses an iteration function, which is a mapping of the plane into itself. Given any point in the plane, an iterative function is a rule that provides another point in the plane. Newton's iteration function is the best known: $N(z)=z-p(z)/p'(z)$. An iteration function can be viewed as a machine that approximates a zero of a polynomial by an iterative process, using a predetermined input and from it, creating an output that in turn becomes a new input to the same machine.

The software allows the user to create an image by inputting a polynomial through several means: by inputting its coefficients, or the location of its zeros, for example, either numerically or by clicking on the monitor. Once the polynomial has been inputted, the user has the capability of selecting many iteration functions. In one approach the user simply inputs a parameter, a counting number between 2 and say 200. The assignment of such a value is analogous to the selection of a particular lens on a camera. This, together with the selection of a user-defined rectangular region and user-specified number of pixels, tolerance, as well as a variety of color mapping schemes, gives the capabilities of creating an infinite number of basic polynomiographs.

From the given polynomial and the selected iteration technique, the software creates an initial image. These polynomiographs are fractal images and can subsequently be re-colored or zoomed in, easily, any number of times. A non-fractal and completely different set of images could result by the visualization of the root-finding process for a given polynomial through the collective use of an infinite family of iteration functions together with prescribed coloring, which is motivated by the convergence behavior of the family.

Mathematical Foundation of Polynomiography

Consider the polynomial $$p(z) = a_n z^n + a_{n-1} z^{n-1} + \ldots + a_1 z + a_0,$$

where $n \geq 2$, and the coefficients $a_0, \ldots, a_n$ are complex numbers. The problem of approximating roots of $p(z)$ is a fundamental and classic problem. Some root-finding methods first obtain a high precision approximation to a root, then approximate other roots after deflation. Many such root-finding methods (e.g., Newton's or Laguerre's) make use of iteration functions. A method that guarantees convergence to all the roots was developed by H. Weyl in 1924. This method is a two-dimensional analogue of the bisection method. Modifications of this method have been used to obtain initial approximation to a root, followed by the use of Newton's method with a guaranteed estimate on the complexity of the approximation. Another root-finding method is based on recursive factorization of the given polynomial. Many deep theoretical complexity results on polynomial root-finding and/or the use of Newton's method are known.

One of the conceptually easiest algorithms for the approximation of all the roots of polynomials makes use of a fundamental family of iteration functions called the Basic Family. The algorithm reveals a magical pointwise convergence of the family to roots. The Basic Family is represented as $\{B_m(z)\}_{m=2}^{\infty}$. The first member of the sequence, $B_2(z)$, is Newton's iteration function, and $B_3(z)$ is Halley's iteration function. Halley's method inspired Taylor's theorem. Many results on the properties of the members of this family, including their close tie with a determinantal generalization of Taylor's theorem, have been reported.

The members of the Basic Family have a interesting closed formula. Let $p(z)$ be a polynomial of degree $n \sim 2$ with complex coefficients. Set $D_0(z) \equiv 1$, and for each natural number $m \geq 1$, define $$D_m(z) = \det \begin{pmatrix} p'(z) & \frac{p''(z)}{2!} & \cdots & \frac{p^{(n-1)}(z)}{(m-1)!} & \frac{p^{(m)}(z)}{(m)!} \\ p(z) & p'(z) & \ddots & \ddots & \frac{p^{(m-1)}(z)}{(m-1)!} \\ 0 & p(z) & \ddots & \ddots & \vdots \\ \vdots & \vdots & \ddots & \ddots & \frac{p''(z)}{2!} \\ 0 & 0 & \cdots & p(z) & p'(z) \end{pmatrix}$$

$$\hat{D}_{m,i}(z) = \det \begin{pmatrix} \frac{p''(z)}{2!} & \frac{p'''(z)}{3!} & \cdots & \frac{p^{(m)}(z)}{(m)!} & \frac{p^{(i)}(z)}{(i)!} \\ p'(z) & \frac{p''(z)}{2!} & \ddots & \frac{p^{(m-1)}(z)}{(m-1)!} & \frac{p^{(i-1)}(z)}{(i-1)!} \\ p(z) & p'(z) & \ddots & \ddots & \vdots \\ \vdots & \vdots & \ddots & \frac{p''(z)}{2!} & \frac{p^{(i-m+2)}(z)}{(i-m+2)!} \\ 0 & 0 & \cdots & p'(z) & \frac{p^{(i-m+1)}(z)}{(i-m+1)!} \end{pmatrix}$$

where $i = m+1, \ldots, n+m-1$, and $\det(\cdot)$ represents determinant.

For each $m \geq 2$, define $$B_m(z) \equiv z - p(z) \frac{D_{m-2}(z)}{D_{m-1}(z)}.$$

Note that $Dm(z)$ corresponds to the determinant of a Toeplitz matrix defined with respect to the normalized derivatives of $p(z)$. *A square matrix is called Toeplitz if its elements are identical along each diagonal.*

Some of the fundamental properties of the members of the Basic Family are described in the following theorem. Its second part in particular, is a very special case of a nontrivial determinantal generalization of Taylor's theorem.

Let C be the field of complex numbers. For a complex number $c = a + ib$, where $i = \sqrt{-1}$, its modulus is $$|c| = \sqrt{a^2 + b^2}.$$

Theorem 1 (Kalantari) The following conditions hold:

1. For all $m \geq 1$, $$Dm(z) = \sum_{i=1}^{n} (-1)^{i-1} \frac{p^{i-1}(z) p^{(i)}(z)}{i!} D_{m-i}(z), \quad D_j = 0, \; j < 0.$$

2. Let $\theta$ be a simple root of $p(z)$. Then, $$B_m(z) \theta + \sum_{i=m}^{m+n-2} (-1)^m \frac{\hat{D}_{m-1,i}(z)}{D_{m-1}(z)} (z - \theta)^i.$$

3. There exists $r > 0$ such that given any $a_0 \in N_r(\theta) = \{z : |z - \theta| \leq r\}$, the fixed-point iteration $a_{k+1} = B_m(a_k)$ is well-defined; it converges to $\theta$ having order m. Specifically, $$\lim_{k \to \infty} \frac{(\theta - a_{k+1})}{(\theta - a_k)^m} = (-1)^{m-1} \frac{\hat{D}_{m-1}, m(\theta)}{p'(\theta)^{m-1}}.$$

4. Let $\theta$ be a simple root of p(z). There exists a neighborhood of $\theta$, N*($\theta$), such that for each a within this neighborhood p'(a)≠0,|a−$\theta$|<1, and $$|p'(a)| - \sum_{i=0, i \neq 1}^{n} |p'(a)|^{\frac{i-1}{2}} \frac{|p^{(i)}(a)|}{i!} \geq \frac{1}{2}|p'(a)|.$$

For any a∈N*($\theta$), if h(a) is defined as $$h(a) = \left[\sum_{i=0}^{n}\left(\frac{|p^{(i)}(a)|}{i!}\right)^2\right]^{1/2},$$

then $$|Bm(a) - \theta| \leq \left|\frac{2h(a)}{p'(a)}(a-\theta)\right|^m \left(\frac{1}{1-|a-\theta|}\right).$$

5. In particular, if $\theta$ is a simple root of p(z), there exists r*∈(0,1) such that given any a∈$N_r$*($\theta$), $$\theta = \lim_{m \to \infty} B_m(a).$$

6. $D_m(a)$ and hence $B_m(a)$ can be computed in O(n log n log m) operations.

To describe a fundamental global convergence property of the sequence, let $$R_p = \{\theta_1, \ldots, \theta_1\}$$

be the set of distinct roots of p(z). The elements of $R_p$ partition the Euclidean plane into Voronoi regions and their boundaries. The Voronoi region of a root $\theta$ is a convex polygon defined by the locus of points that are closer to this root than to any other root. More precisely, the Voronoi region of a root $\theta$ is $$V(\theta) = \{z \in C : |z - \theta| < |z - \theta'|, \forall \theta' \in R_p, \theta' \neq \theta\}.$$

Let $S_p$ be the locus of points equidistant from two distinct roots.

$$S_p = \{z \in C : |z - \theta| = |z - \theta'|, \text{ where } \theta, \theta' \in R_p, \theta \neq \theta'\}.$$

This is a set of measure zero consisting of the union of a finite number of lines.

Definition 1. Given a∈C the Basic Sequence at a is defined as $$B_m(a) = a - p(a)\frac{D_{m-2}(a)}{D_{m-1}(a)}, m = 2, 3, \ldots.$$

Theorem 2 (Kalantari) Given p(z), for any input a∈$s_p$, the Basic Sequence is well-defined satisfying $$\lim_{m \to \infty} Bm(a) = \theta$$

for some $\theta \in R_p$. Under some regularity assumptions (e.g., simplicity of all the roots of p(z)), for all a∈V($\theta$), $\lim_{m \to \infty} B_m(a) = \theta$.

The determinantal generalization of Taylor's theorem given in part 2 of Theorem 1 gives a mechanism for estimating the error |$B_m$(a)−$\theta$|. The Basic Sequence can even be defined for functions that are not polynomial. For example, the pointwise evaluation of the Basic Family (the Basic Sequence in the terminology of Definition 1) is used to give new formulas for approximation of π and e. The relationship between the Basic Sequence and the Basic Family yields new results on general homogeneous linear recurrence relations that are defined via a single, nonzero, initial condition.

Basins of Attractions and Voronoi Region of Polynomial Roots

Consider a polynomial p(z) and a fixed natural number m≥2. The basins of attraction of a root of p(z) *with respect to the iteration function $B_m(z)$ are regions in the complex plane such that given an initial point $a_0$ within them the corresponding sequence $a_{k+1}=B_m(a_k)$, k=0,1, . . . , will converge to that root.* The boundary of the basins of attractions of any of the polynomial roots is the same set. This boundary is known as the Julia set and its complement is known as the Fatou set. The fractal nature of Julia sets and the images of the basins of attractions of Newton's method are now quite familiar for some special polynomials.

While the fractal nature of the Julia sets corresponding to the individual members of the Basic Family follows from the Julia theory on rational iteration function, that theory does not predict the total behavior of specific iteration functions on the complex plane. For instance, the Julia theory does not even predict the shape of basins of attractions of the polynomial p(z)=$z^n$−1 for various members of the Basic Family. In contrast there are important consequences of the results stated in Theorems 1 and 2 that apply to arbitrary polynomials. In particular, Theorem 2 implies that, except possibly for the locus of points equidistant to two distinct roots, given any input a, the Basic Sequence {$B_m$(a)=a−p(a)$D_{m-2}$(a)/$D_{m-1}$(a)} converges to a root of p(z). *Under some regularity assumption (e.g., simplicity of the roots), for almost all inputs within the Voronoi polygon of a root, the corresponding Basic Sequence converges to that root. The Basic Sequence corresponds to the pointwise evaluation of the Basic Family. Theorem* 2 gives rise to a new set of non-fractal polynomiographs with enormous beauty.

Referring now to FIGS. 1 and 2, several fractal images confirm the theoretical convergence results: as m increases, the basins of attractions to the roots, as computed with respect to the iteration function $B_m(z)$, rapidly converge to the Voronoi regions of the roots. Thus the regions with chaotic behavior rapidly shrink to the boundaries of the Voronoi regions.

FIG. 1 depicts a polynomial with a random set of roots, depicted as dots. The evolution of the basins of attraction of the roots to the Voronoi regions is shown as m takes the values 2, 4, 10, and 50. FIG. 2 shows the basins of attractions for the polynomials P(z)=$z^4$−1, corresponding to different values of m. The roots of P(z)=$z^4$−1 are the roots of unity and hence the Voronoi regions are completely symmetric. In these figures, in the case of m=2, (i.e., Newton's method), the basins of attractions are chaotic. However, these regions rapidly improve by increasing m.

General Techniques for Creating Art Work

In order to describe some general techniques for producing polynomiographic images, the capabilities of prototype polynomiography software is first described. The software allows the user to create an image by inputting a polynomial through several means: by inputting its coefficients or the location of its zeros, for example. In one approach the user simply inputs a parameter, m, as any natural number greater than one. The assignment of a value for m corresponds to the selection of $B_m(z)$ as the underlying iteration function. This, together with the selection of a user-defined rectangular region and user-specified number of pixels, tolerance, as well as a variety of color mapping schemes, gives the capabilities of creating an infinite number of basic polynomiographs. Color, as used herein, is meant to be any one or more wavelengths along the spectral band, and may or may not include black, white and shades of gray. These polynomiographs are fractal images and can subsequently be re-colored easily or zoomed in any number of times. A non-fractal and completely different set of images results by the visualization of the root-finding process through the collective use of the Basic Family (i.e., the pointwise convergence property described in Theorem 2). These images are enormously rich. In either type of image creation technique, the user has a great deal of choices: the ability to re-color any selected regions using a variety of coloration based on convergence properties, for example.

Thus, it can be seen that the inventive method comprises a method of creating an image dependent upon a polynomial equation, the steps comprising:
  a) providing a predetermined polynomial equation;
  b) approximating at least one root of said polynomial equation;
  c) generating a graphical image as a function of said at least one root of said polynomial equation; and
  d) colorating said graphical image to produce a two-dimensional, color rendition thereof.

The approximating step (b) comprises performing at least one of an infinite number of iteration functions.

Viewing polynomiography as an art form, at least four general image creation techniques are evident.

1) Like a photographer who shoots different pictures of a model and uses a variety of lenses, a polynomiographer can produce different images of the same polynomial and make use of a variety of iteration functions and zooming approaches until a desirable image is discovered.

2) An initial polynomiograph, possibly very ordinary, is turned into a beautiful image, based on the user's coloration, individual creativity, and imagination. This is analogous to carving a statue out of stone.

3) The user employs the mathematical properties of the iteration functions, or the underlying polynomial, or both.

4) Images can be obtained as a collage of two or more polynomiographs obtained through one of the previous three methods.

Many other image creation techniques are possible, either through artistic compositional means, or through computer assisted design programs.

Referring now to FIGS. 3–14, an exhibition of polynomiographic images indicates that the images are not necessarily symmetric. The optimal size for the display of some of the images is poster size, because at that size one begins to see and appreciate the real complexity and detail of the images.

Figure 12A:
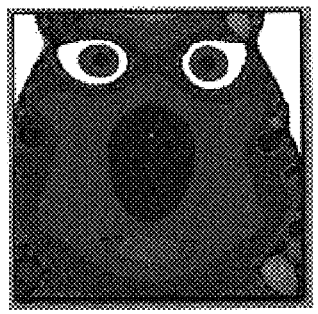
Figure 12B:
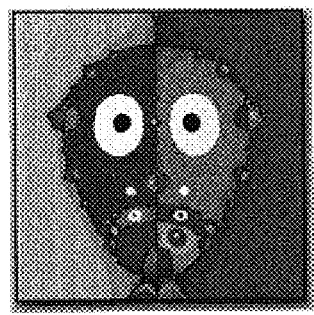

With the exception of some of the images in FIGS. 10 and 12a, all other images have resulted from a single input polynomial. In FIG. 12a, all regions that depict different features were derived from a single polynomial, except for the lips, a polynomiograph itself, which was derived from a different polynomial and was collaged.

Figure 13A:
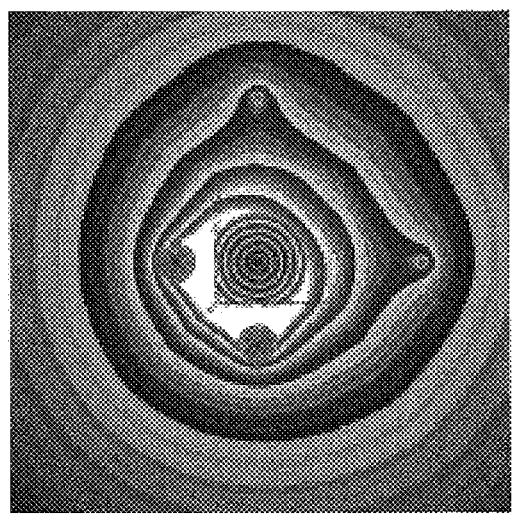
FIG. 13c is a diagram representing the ascending order of convergence of $B_m^{(k)}$, and the corresponding orders for a partial table of iteration functions.
Figure 13B:
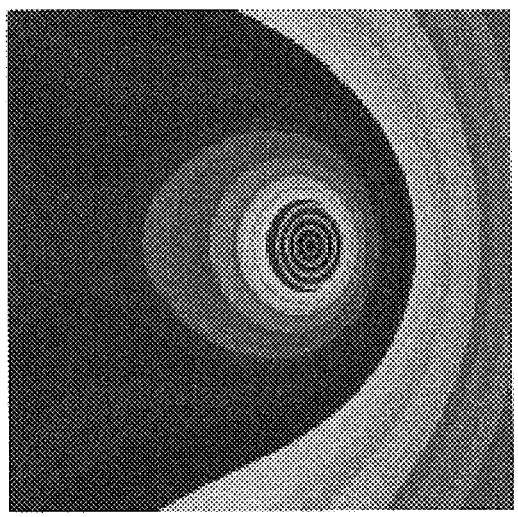

Referring now to FIGS. 13a and 13b, a polynomial of degree 10 was used to produce FIG. 13a. Then as a result of zooming in on one of the significant parts of that image, FIG. 13b was obtained. A coloration of various layers resulted in the final image shown in FIG. 5b.

Figure 5A:
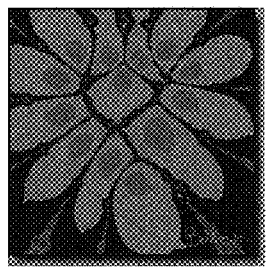
Figure 5B:
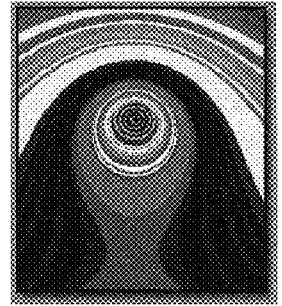
Figure 5C:
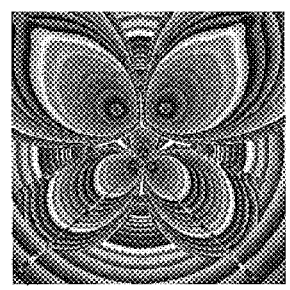
Figure 6A:
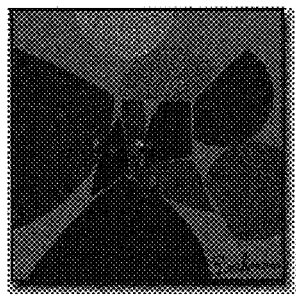
Figure 6B:
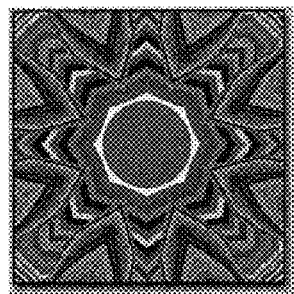
Figure 6C:
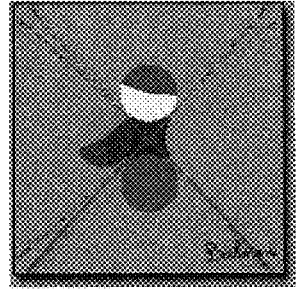
Figure 7A:
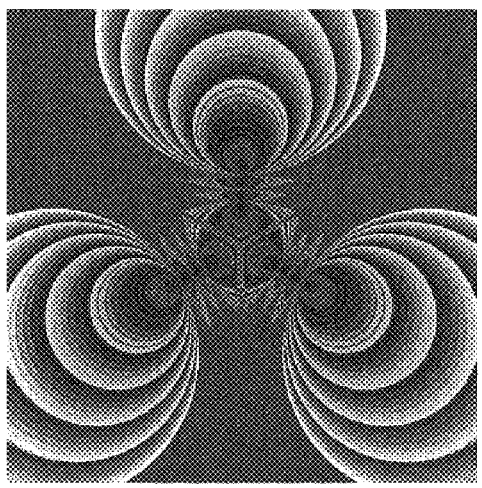
Figure 7B:
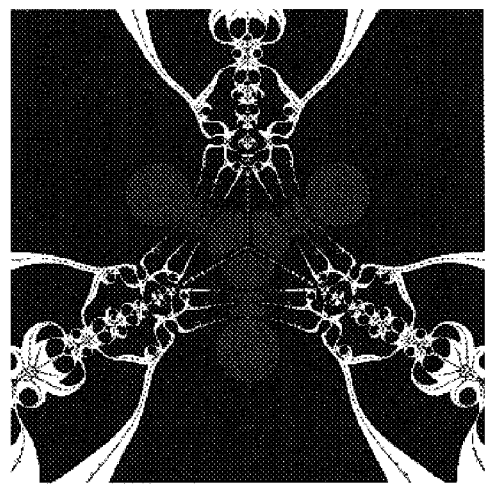
Figure 8A:
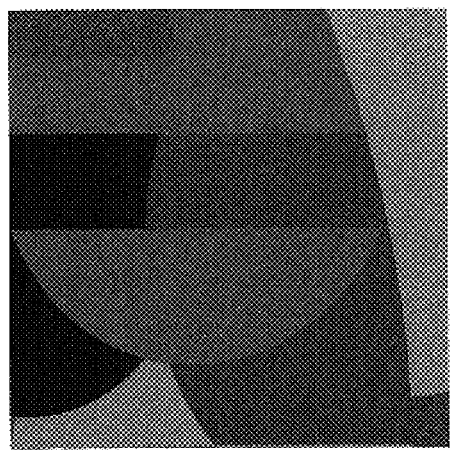
Figure 8B:
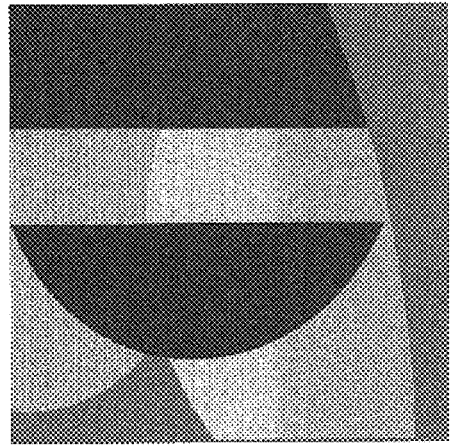

Referring to FIG. 5a, the inventive software allows the user to enter a polynomial by clicking on the location of the roots on the working canvas of the computer monitor. The software then builds the polynomial from the roots. Subsequently any one of the techniques can be applied. The image shown in FIG. 5a was produced simply by drawing a heart shape and then by applying one of the techniques, together with personal coloration.

Figures 10A, 10B, 10C, 10D, 10E:
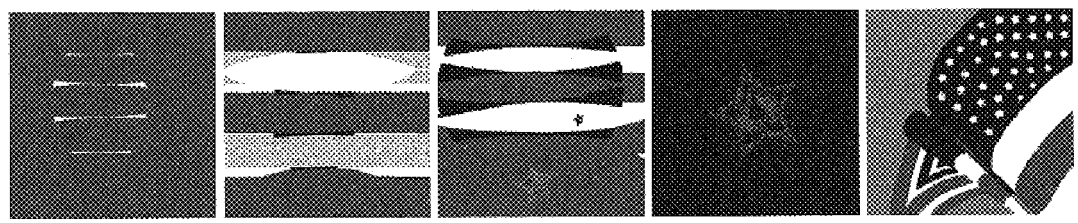
Figure 11A:
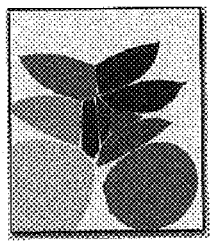
Figure 11B:
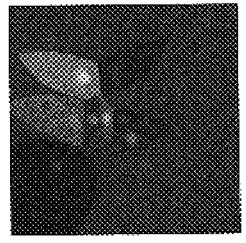
Figure 11C:
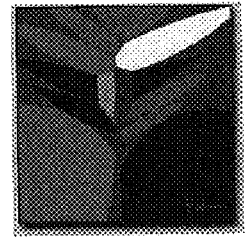

Referring to FIGS. 10a–10e, the inspiration to create a polynomiographic image of the U.S. flag came from Jasper Johns paintings of the flag. The first image was conceived by making use of the convergence properties of the Basic Family and the fact that the basins of attractions converge to Voronoi region of the roots. The underlying polynomial for the image in FIG. 10a is a polynomial of degree five whose roots consist of five points on a vertical line. The images shown in FIGS. 10b and 10c are variations of the first one (FIG. 10a). The star image (FIG. 10d) was obtained from a single polynomial and is collaged (after reduction of size) onto the image of FIG. 10c. The final image (FIG. 10e) was derived from the coloration of a polynomiograph of a single polynomial (zoomed in at an appropriate area) together with the collage of white stars from a different polynomiograph than that of the evolving star. The five images give the impression that the flag is evolving. The appearance of the stripes and the emergence of the color white (FIG. 10a) is displayed first; the close up of the first image, while the evolution is in progress, which reveals the emergence of the color blue (FIG. 10b); the creation of starts and the continuous growth and reshaping of white and blue regions (FIG. 10c); a close-up of one of the forming stars which appears as if it is in rotation (FIG. 10d); and finally the orderly formations of various components of the flag and the settling of the stars (FIG. 10e).

Symmetric Designs from Polynomiography

Figure 14:
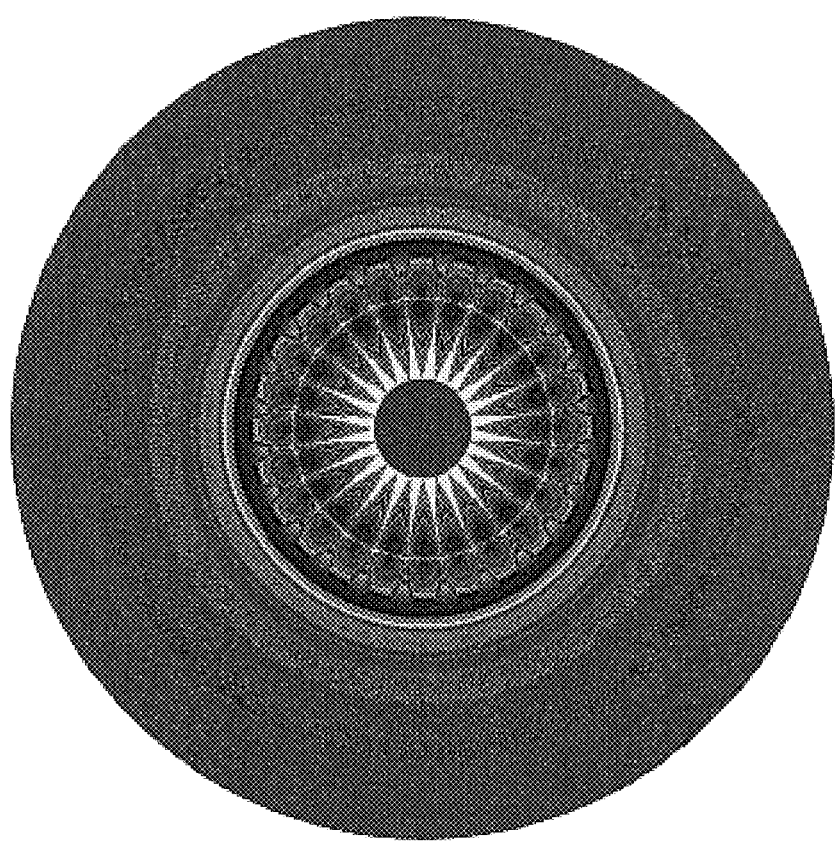
Figure 15A:
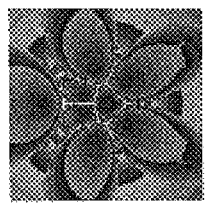
FIGS. 15a–15f illustrate a polynomiograph of six different nine digit numbers.
Figure 15B:
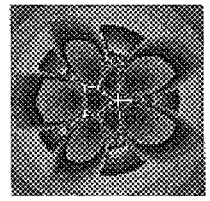
Figure 15C:
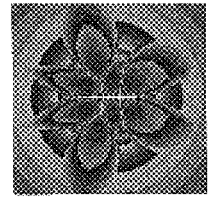
Figure 15D:
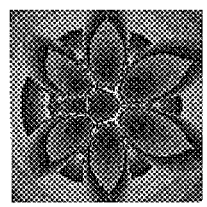
Figure 15E:
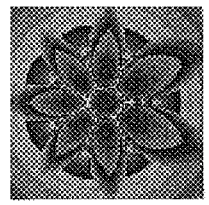
Figure 15F:
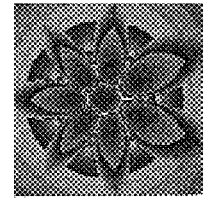
Figure 17:
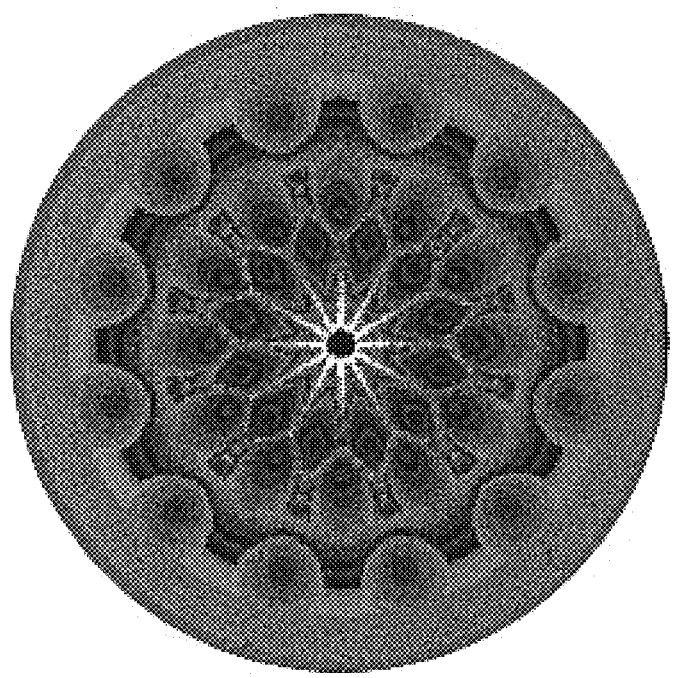
FIG. 17 shows a polynomiograph of a degree 36 polynomial.

Symmetric designs can be obtained by considering polynomials whose roots have symmetric patterns. One can obtain interesting images by simply considering polynomials whose roots are the roots of unity or more generally n-th root of a real number r. By multiplication of these polynomials, as well as rotation of the roots, one can obtain interesting basic designs that can subsequently be painted into beautiful designs. The images in FIGS. 14 and FIG. 17 are such examples.

Polynomiographs of Numbers

One interesting application of polynomiography is in encryption of numbers (e.g., ID numbers or credit card numbers) into a two dimensional image that resembles a fingerprint. Different numbers exhibit different fingerprints. One way to visualize numbers as polynomiographs is to represent them as polynomials. For instance a hypothetical social security number a8a7...a0 can be identified with the polynomial $P(z)=a_8z^8+ \ldots +a_1z+a_0$. The techniques discussed above can then be applied. A particularly interesting visualization results when the software makes use of Basic Family collectively (see Theorem 2). FIGS. 15a–15f show several examples.

All of the images are distinct except possibly the two lower right-most images, because they are consecutive numbers. Upon closer examination of FIGS. 16a–16b, their differences can be noticed immediately. Given such polynomiograph for a number, it should be possible to build scanners that can convert the image back into the original number. The conversion requires the recognition of the roots and the recovery of the corresponding polynomial coefficients.

The polynomiographic pattern in FIG. 17 was motivated by a design from a Persian carpet and made use of pointwise convergence described in Theorem 2. It is possible to obtain much more sophisticated patterns than this.

At a more advanced level, polynomiography can be used to teach fundamentals of design and color theory. While Information Science software has transformed the advanced Graphic Design curriculum through Photo Shop™, Quark™, and similar programs, the visual arts curriculum makes little use of Information Science at the fundamentals level. Polynomiography provides the opportunity to teach decision making in composition, spatial construction, and color at a much more complex level than present systems which rely on traditional methods of drawing and collage. Through using the inventive polynomiography software, students have infinite design possibilities. In making their selections, they can experiment with symmetry and asymmetry, repetition, unity, balance, spatial illusion, line, and plane. By using color, they can gain understanding of complementary color, value relationships, and balance, while learning to manipulate hue, tint, and intensity.

A nontrivial determinantal generalization of Taylor's formula plays a dual role in the approximation of a given function or its inverse (hence its roots). On the one hand, the determinantal Taylor formula unfolds each ordinary Taylor polynomial into an infinite spectrum of rational approximations to the given function. On the other hand, these formulas give an infinite spectrum of rational inverse approximations, as well as single and multipoint iteration functions that include the Basic Family. Given $m \geq 2$, for each $k \leq m$, a k-point iteration function is obtained, defined as the ratio of two determinants that depend on the first m−k derivatives. These matrices are upper Hessenberg and for k=1 also reduce to Toeplitz matrices. The corresponding iteration function is denoted by $B_m^{(k)}$. Their order of convergence ranges from m to the limiting ratio of the generalized Fibonacci numbers of order m.

Referring now to FIG. 13c, the diagram represents the ascending order of convergence of $B_m^{(k)}$, and the corresponding orders for a partial table of iteration functions.

The Basic Family is only the first column of the diagram shown in FIG. 13c. Computational results with polynomials of degree up to 30 revealed that for small degree polynomials, $B_m^{(k-1)}$ is more efficient than $B_m^{(k)}$, but as the degree increases, $B_m^{(k)}$ becomes more efficient than $B_m^{(k-1)}$.

The most efficient of the nine root-finding methods is the derivative-free method $B_4^{(4)}$, having theoretical order of convergence equal to 1.927. Newton's method is, in fact, the least efficient method. More computational results and with a bigger subset of the infinite table of FIG. 13c could reveal further practicality of the multipoint iteration family.

Figure 18:
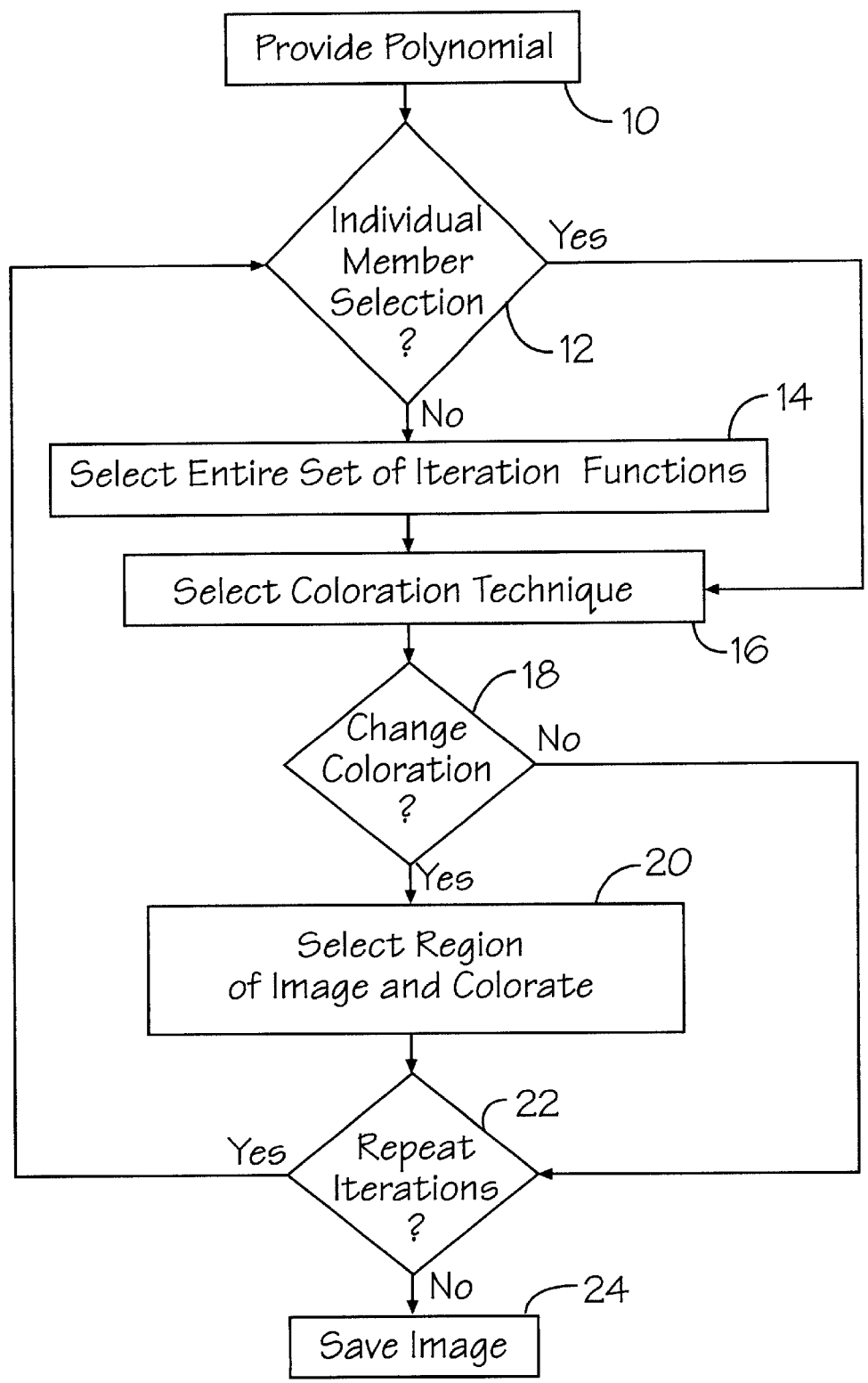
FIG. 18 shows a flowchart for an embodiment of the invention.

Referring now to FIG. 18, there is shown a flow chart of operations for the inventive method. A polynomial is provided and input to the system, step 10, either through its coefficients, location of its zeros, or by clicking on the desired locations of the working canvas of the computer monitor. A particular method of iteration is selected from an infinite family of iteration functions, called the Basic Family, either by selecting a particular member through the selection of a parameter between 2 and essentially any large number, say 200 or much larger, step 12, or by selecting the entire collection of iteration functions, step 14, simply by clicking on a radio button (not shown) on the software window.

A particular initial coloration scheme is then selected from among a number of such coloration techniques, step 16. These coloration schemes are suggested by the algorithms and their mathematical properties, or for artistic goals. This results in initial coloration of the selected polynomial.

The initial coloration of various regions can be modified or changed, step 18, using a variety of software capabilities. The user can select a particular region, step 20, simply by clicking on any point within that region. The image is then saved, step 24, if needed, or steps 10 through 20 are repeated, step 22.

The default region (nominally 400 by 400 pixels) can be reset to any desirable size in order to view the given polynomial. Each pixel can be manipulated by the selected algorithm or iteration function.

The path of convergence can be found by clicking at any point, to the root to which the point converges. Moreover, the tolerance can be set at any desirable level.

The software itself can be changed from the Euclidean norm used in convergence to any other norm (e.g., the Manhattan norm or the infinity norm), in order to get other artistic effects. Methods are also incorporated that allow quick recoloration schemes without recomputing regions of convergence.

The properties of the Basic Family and the Basic Sequence give rise to new algorithmic strategies. When the given input a is close enough to a simple root of the underlying polynomial, for any $m \leq 2$, the Basic Sequence can be turned into an iterative method of order m, by replacing the given input a with $B_m(a)$, and repeating. There are many computational implications of these results. As an example, consider one possible algorithm for polynomial root-finding. For a given input a, continue producing $B_m(a)$ until the difference between $B_{m(a)}$ and $B_{m+1}(a)$ is small. Then for a desirable m, replace a with $B_m(a)$ and repeat in order to obtain higher and higher accuracy. It is also possible to switch back and forth between the two schemes.

An algorithm suggested by the global convergence properties of the Basic Sequence in order to compute all the roots of a given polynomial is as follows: first, obtain a rectangle that contains all the roots. Then by selecting a sparse number of gird points generate the corresponding Basic Sequence and thereby obtain good approximation to a subset of the roots. After deflation, the same approach can be applied to find additional roots. This method could provide an excellent alternative to the aforementioned method of Weyl. Experimentation with this method is intended and will be reported in the future.

In addition to the above multipoint versions of the Basic Family, it is also possible to define an infinite Truncated Basic Family, as well as a parameterized Basic Family.

Polynomiography can become a new art form and can also be used to create functional items such as clothing and carpets, for example. Polynomiography, in other words, also provides a potentially powerful tool for architectural, furniture, and other kinds of design. This is in the sense that some two-dimensional polynomiographs give rise to three-dimensional objects. Working with a polynomiography software is comparable to working with a camera or a musical instrument. Through practice one can learn to produce the most exquisite and complex patterns. These designs, at their best, are analogous to the most sophisticated human designs. The intricate patterning of Islamic art, the composition of Oriental carpets, or the elegant design of French fabrics are very similar to the symmetrical, repetitive, and orderly graphic images produced through polynomiography. But polynomiographic designs can also be irregular, asymmetric, and non-recurring, suggesting parallels with the work of artists associated with Abstract Expressionism and Minimalism.

The polynomiographer can create an infinite variety of designs, made possible by employing an infinite variety of iteration functions (analogous to the lenses of a camera) to the infinite class of complex polynomials (analogous to photographic models). The polynomiographer then may go through the same kind of decision making as the photographer: changing scale, isolating parts of the image, enlarging or reducing, adjusting values and color until the polynomiograph is resolved into a visually satisfying entity. Like a photographer, a polynomiographer can learn to create images that are esthetically beautiful and individual. Like an artist and a painter, a polynomiographer can be creative in coloration and composition of images.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A computerized method for creating an image dependent upon a polynomial equation, the steps comprising:
   a) providing a predetermined polynomial equation;
   b) approximating at least one root of said polynomial equation by performing at least one of an infinite number of iteration functions that is represented as $\{B_m(z)\}_m^\infty$, wherein $B_m(z)$ represents a fundamental family of iteration functions called the "Basic Family," m is a natural number ranging $\infty \geq m \geq 2$, and z is a complex number representing an input or variable, whereby each Basic Family member will visualize any polynomial equation in a different manner to produce unique images even if applied to the same polynomial equation;
   c) selecting either one or any combination of said Basic Family of iteration functions to produce graphical images based upon said polynomial equation;
   d) generating a graphical image as a function of the selected Basic Family member or members and said at least one root of said polynomial equation; and
   e) colorating said graphical image to produce an initial color rendition thereof.

2. The computerized method for creating an image dependent upon a polynomial equation in accordance with claim 1, wherein said approximating step (b) converges said at least one of said iteration functions to said approximations of said roots of said polynomial equation.

3. The computerized method for creating an image dependent upon a polynomial equation in accordance with claim 1, the steps further comprising:
   f) applying said color rendition of said graphical image to one of the group consisting of furniture, apparel, textiles, carpets, two-dimensional objects, and three-dimensional objects.

4. The computerized method for creating an image dependent upon a polynomial equation in accordance with claim 3, wherein said graphical image is two-dimensional.

5. The computerized method for creating an image dependent upon a polynomial equation in accordance with claim 1, wherein said graphical image is two-dimensional.

6. The computerized method for creating an image dependent upon a polynomial equation in accordance with claim 1, wherein said "Basic Family" is further defined as $B_m(z) \equiv z - p(z)$, $$\frac{D_{m-2}(z)}{D_{m-1}(z)},$$

wherein the determinant $D_m(z)$ is as follows:

$$D_m(z) = \det\begin{pmatrix} p'(z) & \frac{p''(z)}{2!} & \cdots & \frac{p^{(n-1)}(z)}{(m-1)!} & \frac{p^{(m)}(z)}{(m)!} \\ p(z) & p'(z) & \ddots & \ddots & \frac{p^{(m-1)}(z)}{(m-1)!} \\ 0 & p(z) & \ddots & \ddots & \vdots \\ \vdots & \vdots & \ddots & \ddots & \frac{p''(z)}{2!} \\ 0 & 0 & \cdots & p(z) & p'(z) \end{pmatrix}$$

wherein $D_0(z) \equiv 1$, $D_1(z) = p'(z)$, $m \geq 2$, $n \geq 2$, and $p(z)$ is a polynomial of degree n with complex coefficients.

7. The computerized method for creating an image dependent upon a polynomial equation in accordance with claim 1, wherein said colorating step further includes the step of (g) selectively changing the initial coloration of said graphical image.

8. The computerized method for creating an image dependent upon a polynomial equation in accordance with claim 7, further including the step of (h) individually selecting particular regions of said graphical images for changing the respective coloration thereof.

9. The computerized method for creating an image dependent upon a polynomial equation in accordance with claim 8, further including the step of (i) repeating steps (a) through (h) for obtaining different graphical images by either one or a combination of changing the polynomial equation in step (a), changing the root approximation in step (a), and selecting a different one or combination of said Basic Family of iteration functions in step (c).

* * * * *